United States Patent [19]

Holtey et al.

[11] 4,257,101
[45] Mar. 17, 1981

[54] HARDWARE IN A COMPUTER SYSTEM FOR MAINTENANCE BY A REMOTE COMPUTER SYSTEM

[75] Inventors: Thomas O. Holtey, Newton; Kin C. Yu, Burlington, both of Mass.

[73] Assignee: Honeywell Information Systems Inc., Waltham, Mass.

[21] Appl. No.: 314

[22] Filed: Jan. 2, 1979

[51] Int. Cl.³ .......................................... G06F 15/16
[52] U.S. Cl. .................................................. 364/200
[58] Field of Search ....... 364/200 MS FILE, 900 MS FILE,

[56] References Cited

U.S. PATENT DOCUMENTS

| | | | |
|---|---|---|---|
| 4,010,451 | 3/1977 | Kibble et al. | 364/200 |
| 4,057,848 | 11/1977 | Hayashi | 364/200 |
| 4,068,303 | 1/1978 | Morita | 364/200 |

Primary Examiner—Raulfe B. Zache
Attorney, Agent, or Firm—Nicholas Prasinos; Ronald T. Reiling

[57] ABSTRACT

A remote maintenance apparatus for performing maintenance via a communication channel. Hardware is provided to retain information in a special channel which can be accessed by a remote communication system, in the event of malfunction in the computer system. An additional feature of this hardware is increased speed and efficiency in addressing when the computer system is operating normally.

10 Claims, 17 Drawing Figures

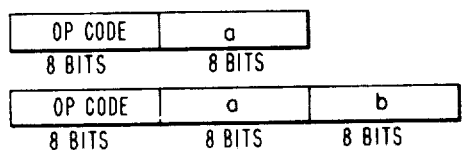
FIG. 1B
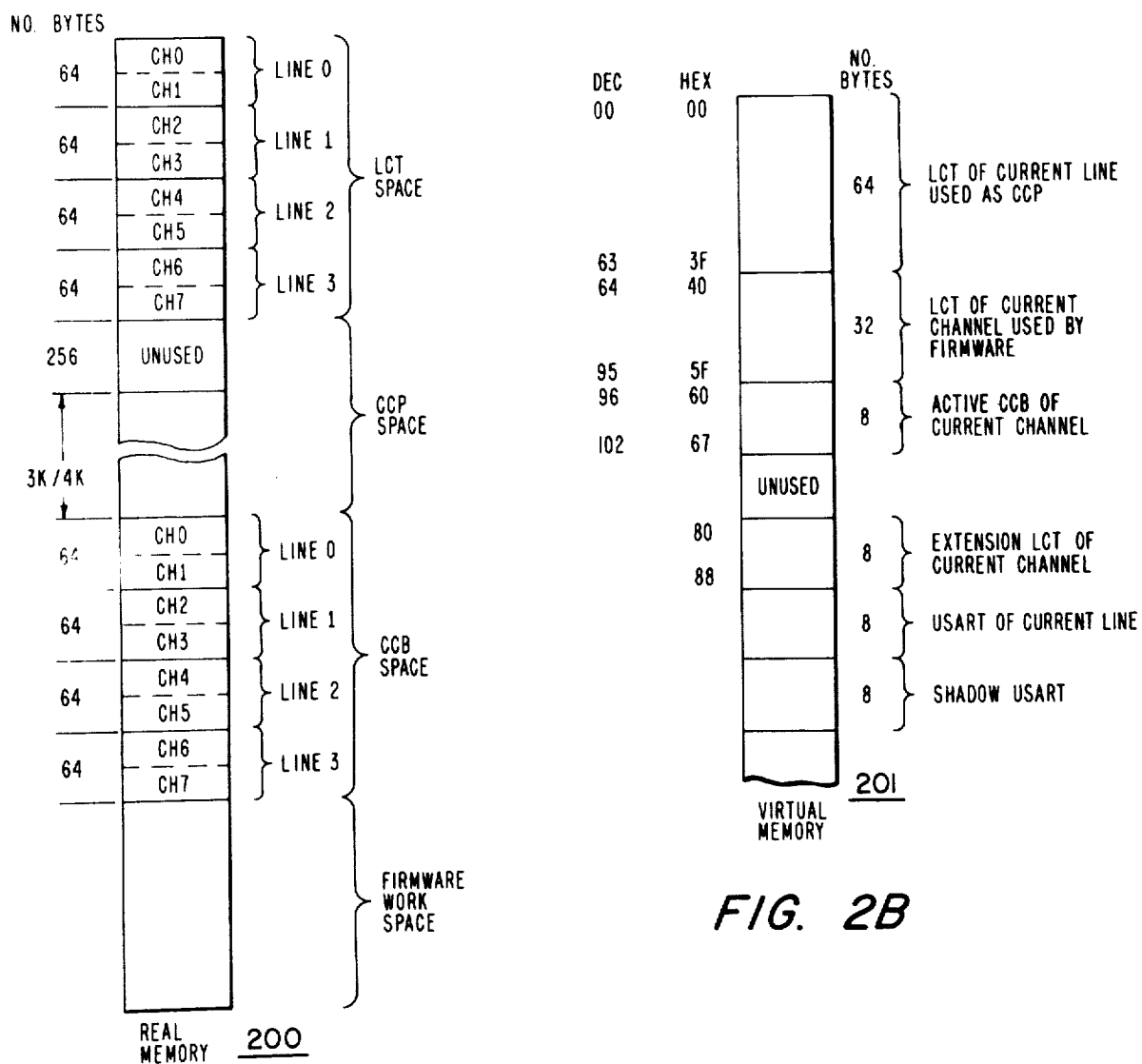
FIG. 2A
FIG. 2B

PAGING PROM MAP

| VIRTUAL ADDRESS HEX. | PROM ADDRESS | PROM DEC. LOC. | HEX MAP AT LOC. | BINARY MAP AT LOC. | | | | | | | |
|---|---|---|---|---|---|---|---|---|---|---|---|
| | | | | 7 | 6 | 5 | 4 | 3 | 2 | 1 | 0 |
| 0000-7 | 140 | 0  | 7F | 0 | 1 | 1 | 1 | 1 | 1 | 1 | 1 |
| 8-F    | 150 | 1  | 7F | 0 | 1 | 1 | 1 | 1 | 1 | 1 | 1 |
| 10-17  | 160 | 2  | 7F | 0 | 1 | 1 | 1 | 1 | 1 | 1 | 1 |
| 18-19  | 170 | 3  | 7F | 0 | 1 | 1 | 1 | 1 | 1 | 1 | 1 |
| 20     | 180 | 4  | 7F | 0 | 1 | 1 | 1 | 1 | 1 | 1 | 1 |
| 28     | 190 | 5  | 7F | 0 | 1 | 1 | 1 | 1 | 1 | 1 | 1 |
| 30     | 200 | 6  | 7F | 0 | 1 | 1 | 1 | 1 | 1 | 1 | 1 |
| 38     | 210 | 7  | 7F | 0 | 1 | 1 | 1 | 1 | 1 | 1 | 1 |
| 40     | 220 | 8  | 3F | 0 | 0 | 1 | 1 | 1 | 1 | 1 | 1 |
| 48     | 230 | 9  | 3F | 0 | 0 | 1 | 1 | 1 | 1 | 1 | 1 |
| 50     | 240 | 10 | 3F | 0 | 0 | 1 | 1 | 1 | 1 | 1 | 1 |
| 58     | 250 | 11 | 3F | 0 | 0 | 1 | 1 | 1 | 1 | 1 | 1 |
| 60     | 260 | 12 | 0F | 0 | 0 | 0 | 0 | 1 | 1 | 1 | 1 |
| 68     | 270 | 13 | FF | 1 | 1 | 1 | 1 | 1 | 1 | 1 | 1 |
| 70     | 280 | 14 | FF | 1 | 1 | 1 | 1 | 1 | 1 | 1 | 1 |
| 78     | 290 | 15 | FF | 1 | 1 | 1 | 1 | 1 | 1 | 1 | 1 |
| 80     | 300 | 16 | 2E | 0 | 0 | 1 | 0 | 1 | 1 | 1 | 0 |
| 88     | 310 | 17 | 66 | 0 | 1 | 1 | 0 | 0 | 1 | 1 | 0 |
| 90     | 320 | 18 | 6C | 0 | 1 | 1 | 0 | 1 | 1 | 0 | 0 |
| 98     | 330 | 19 | FF | 1 | 1 | 1 | 1 | 1 | 1 | 1 | 1 |
| A0     | 340 | 20 | EA | 1 | 1 | 1 | 0 | 1 | 0 | 1 | 0 |
| A8     | 350 | 21 | EC | 1 | 1 | 1 | 0 | 1 | 1 | 0 | 0 |
| B0     | 360 | 22 | EC | 1 | 1 | 1 | 0 | 1 | 1 | 0 | 0 |
| B8     | 370 | 23 | FF | 1 | 1 | 1 | 1 | 1 | 1 | 1 | 1 |
| C0     | 380 | 24 | EA | 1 | 1 | 1 | 0 | 1 | 0 | 1 | 0 |
| C8     | 390 | 25 | 6E | 0 | 1 | 1 | 0 | 1 | 1 | 1 | 0 |
| D0     | 400 | 26 | 6E | 0 | 1 | 1 | 0 | 1 | 1 | 1 | 0 |
| D8     | 410 | 27 | FF | 1 | 1 | 1 | 1 | 1 | 1 | 1 | 1 |
| E0     | 420 | 28 | EA | 1 | 1 | 1 | 0 | 1 | 0 | 1 | 0 |
| E8     | 430 | 29 | FF | 1 | 1 | 1 | 1 | 1 | 1 | 1 | 1 |
| F0     | 440 | 30 | FF | 1 | 1 | 1 | 1 | 1 | 1 | 1 | 1 |
| F8     | 450 | 31 | EE | 1 | 1 | 1 | 0 | 1 | 1 | 1 | 0 |

*FIG. 1C*

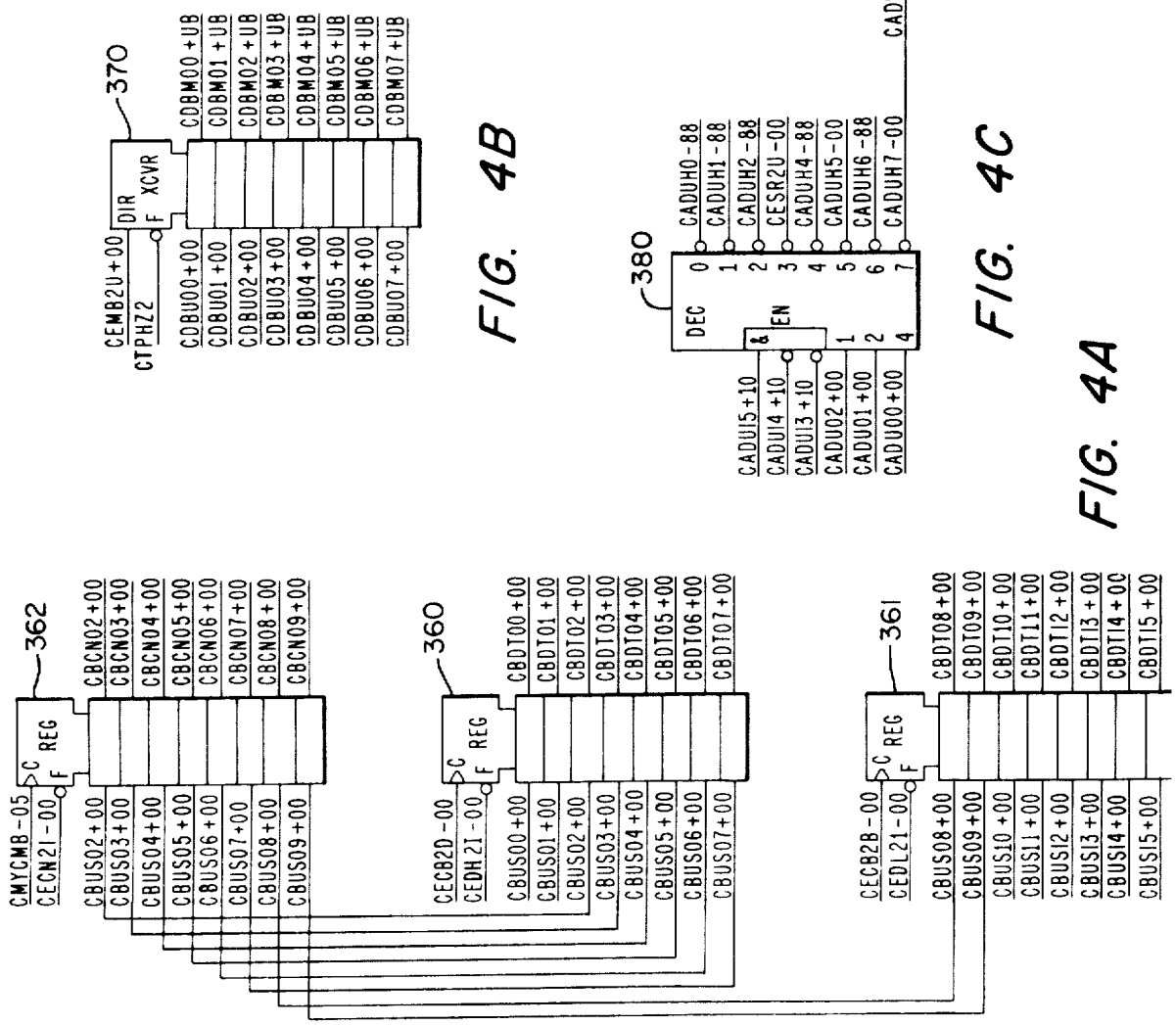

HARDWARE IN A COMPUTER SYSTEM FOR MAINTENANCE BY A REMOTE COMPUTER SYSTEM

RELATED APPLICATIONS

The following U.S. patent applications filed on an even date with the instant application and assigned to the same assignee as the instant application are related to the instant application.
1. "Remote Power Controller Utilizing Communication Lines" by Arthur P. Ferlan, and having U.S. Ser. No. 000,461.
2. "Multi-Way Vectored Interrupt Capability" by Thomas O. Holtey and Kin C. Yu, and having U.S. Ser. No. 000,402.
3. "Hardware for Extending Microprocessor Addressing Capability" by Thomas O. Holtey and Robert C. Miller, and having U.S. Ser. No. 000,304.
4. "I/O Priority Resolver" by Thomas O. Holtey, and having U.S. Ser. No. 000,477.
5. "Paging Mechanism" by Thomas O. Holtey, Robert C. Miller and Kin C. Yu, and having U.S. Ser. No. 000,463.
6. "I/O Request Interrupt Mechanism" by Thomas O. Holtey, and having U.S. Ser. No. 000,315.

BACKGROUND OF THE INVENTION

1. Field of the Invention

The invention relates to data processing systems and more particularly to addressing apparatus for facilitating remote maintenance of a computer system.

2. Description of the Prior Art

Normally, a computer memory stores both operands and computer commands or instructions. Operands are generally data which is to be operated upon, and commands are instructions which collectively form a computer program. An instruction word normally includes a command portion which addresses a location in the computer memory. The number of locations in memory which can be addressed by a given instruction via binary rotation depends on the number of bits allocated to the address portion of the instruction word and the hardware responsive to those bits. Normally, instruction words are comprised of eight bit bytes, although any other number of bits may be utilized in a byte. Also it is not uncommon for the address portion of an instruction to include one, two, three or more bytes. An address portion of an instruction having only one, eight bit bytes can only address $2^8 = 256$ locations in memory, whereas an address portion having two, eight bit bytes can address $2^{16} = 65,536$ locations. Although more memory locations can be addressed with two, eight bit bytes, more time, and a greater number of cycles are necessary in fetching each address word from memory and executing it. Furthermore, more memory space is necessary in storing the larger words. With the trend toward minicomputers and microprocessors, computer memory and throughput are at a premium. Accordingly, what is required for minicomputers, microprocessors and communication processors is an improved addressing mechanism which will permit greater addressing capability with a minimum of computer cycle time in fetching the address portion of an instruction. Additionally, when a computer system malfunctions it is desirable to perform diagnostics from a remote station hundreds and even thousands of miles away. Hence, cost in maintaining a computer network can be substantially reduced.

The prior art is replete with memory addressing devices which have been designed to improve the addressing of computer main memories. A typical computer main memory may have a straightforward addressing mechanism with the ability to address any desired number of characters beginning with any randomly selected position.

Instructions stored in main memory are generally stored in contiguous locations in groups so that the group comprises a computer program. Accordingly, it is generally not necessary to fetch another address to locate the second instruction and so on, because the original address can be modified by adding the number one to the address already fetched (or some other number) thus indexing it to the next contiguous location to be fetched.

Other modification techniques comprise index-registers which are addressed by the original address and either replace or modify the original address to give a new address for the operand to be fetched. A typical device of this type is disclosed by H. Trauboth in U.S. Pat. No. 3,284,778 issued Nov. 8, 1966.

Further refinements to the computer addressing techniques led to relative addressing wherein the address portion of an instruction does not refer to the absolute memory address desired, but to some relative address such as a page or segment located in main memory. This page or segment can be located relative to the beginning of the segment or page. Accordingly, hardware can concatenate the relative address within a segment or page with the location of the beginning of that segment or page with main memory to locate the absolute address. Typical of this type of apparatus is the U.S. Pat. No. 3,938,096 to James L. Brown, et al issued Feb. 10, 1976 and U.S. Pat. No. 3,461,433 issued to W. C. Emerson on Aug. 12, 1969.

Still other addressing schemes increase speed and throughput by making use of a high speed-small capacity memory to supplement main memory, and to which addresses are prefetched prior to their use by the addressing mechanism. Hence speed in addressing is attained. Typical of this type device is that disclosed by Yohan Chu in U.S. Pat. No. 3,251,041 issued May 10, 1966.

To increase main memory capacity, a virtual memory system was devised wherein the operating system such as that used in the IBM System 370 maps addresses resident on magnetic disk on to main memory. The user addresses main memory and the appearance to the user is that he has a vast capacity of main memory (See Computer Organization and the System/370 by Harry Katzan Jr., published in 1971 by Van Nostrand Reinhold Company of New York). This is some of the prior art relating to memory addressing schemes of which the applicants are aware. It is presented as background information and no implication should be drawn that this is the closest prior art to the invention or that a search has been made.

All these schemes have generally been directed to large computer systems and generally require additional hardware such as index registers and buffer-memories. Moreover, memory space is not as much at a premium for large computers as with small computers.

What is required of the small computer is an improved address modification system which utilizes the hardware of the basic addressing mechanism and at the same time minimizes cycle time for accessing multiple address words. Furthermore, it is desirable to perform diagnostics on the computer system via a communication channel from a remote location.

OBJECTS OF THE INVENTION

It is a primary object of the invention to provide an improved computer main memory addressing mechanism having a remote maintenance capability.

It is another object of the invention to provide an improved computer memory addressing mechanism having improved address modification.

It is still another object of the invention to provide an improved computer memory addressing mechanism which provides for storing information in a "shadow" location as well as the addressed location.

It is still another object of the invention to provide an improved computer memory addressing mechanism which requires a minimum of addressing cycle.

SUMMARY OF THE INVENTION

The foregoing objects are achieved according to one embodiment of the invention by providing hardware for addressing various physical devices coupled to various communication buses, and for additionally storing the addressing information in a "shadow" location of a special communication channel.

Five bits of an eight bit address are utilized to address a paging signal generator to typically generate eight control signals. These eight control signnals are utilized to modify the eight bit address (which can normally address only 256 locations by 8 bits per address location in main memory) to provide additional addressing capability for the eight bit address. When the control signal is active for a particular bit, that bit is modified or another bit is substituted. When the control signal is not active, the original bit in the address is utilized. When physical devices such as registers, USARTS, etc., are addressed, the information for these devices is additionally stored in a "shadow" location in a special area of main memory reserved for communication channels.

BRIEF DESCRIPTION OF THE DRAWINGS

The novel features which are characteristic of the invention are set forth with particularity in the appended claims. The invention itself, however, both as to organization and operation together with further objects and advantages thereof may best be understood by reference to the following description taken in conjunction with the drawings in which:

FIG. 1A is a schematic block diagram of the preferred embodiment of the invention.

FIG. 1B is a schematic diagram of typical addressing formats of the invention.

FIG. 1C is a map of the paging PROM.

FIG. 2A is a schematic diagram of a typical organization of the real memory of the invention.

FIG. 2B is a schematic diagram of a typical organization of the virtual memory of the invention.

FIGS. 3, 4, 4A, 4B, 4C, 5A, 5B and 7 are diagrams of the preferred embodiment of the invention.

DETAILED DESCRIPTION OF THE INVENTION

Figure 1A:
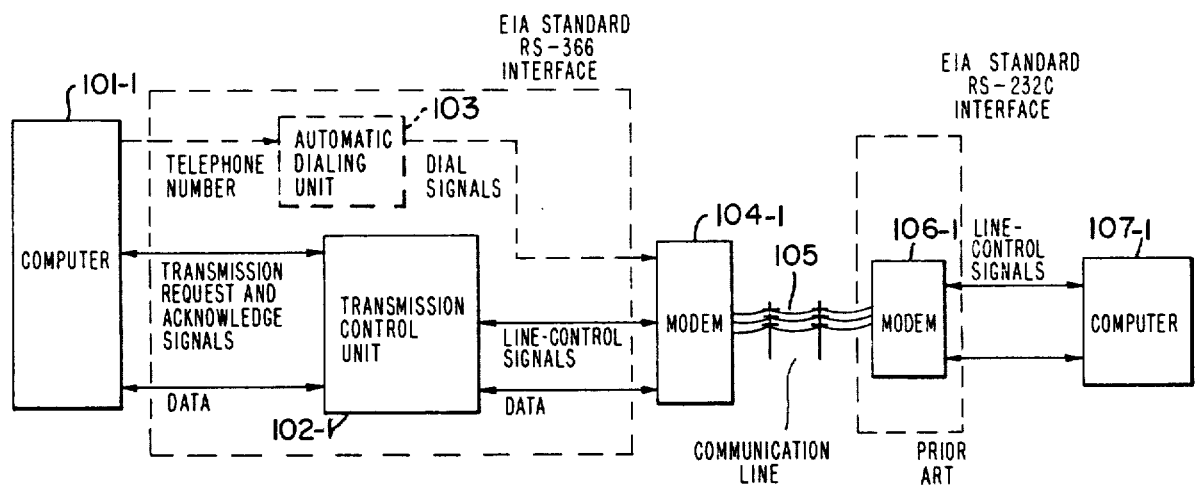
FIG. 1AA is a more detailed schematic diagram of a computer system utilizing telephone lines for communication.
Figure 1:
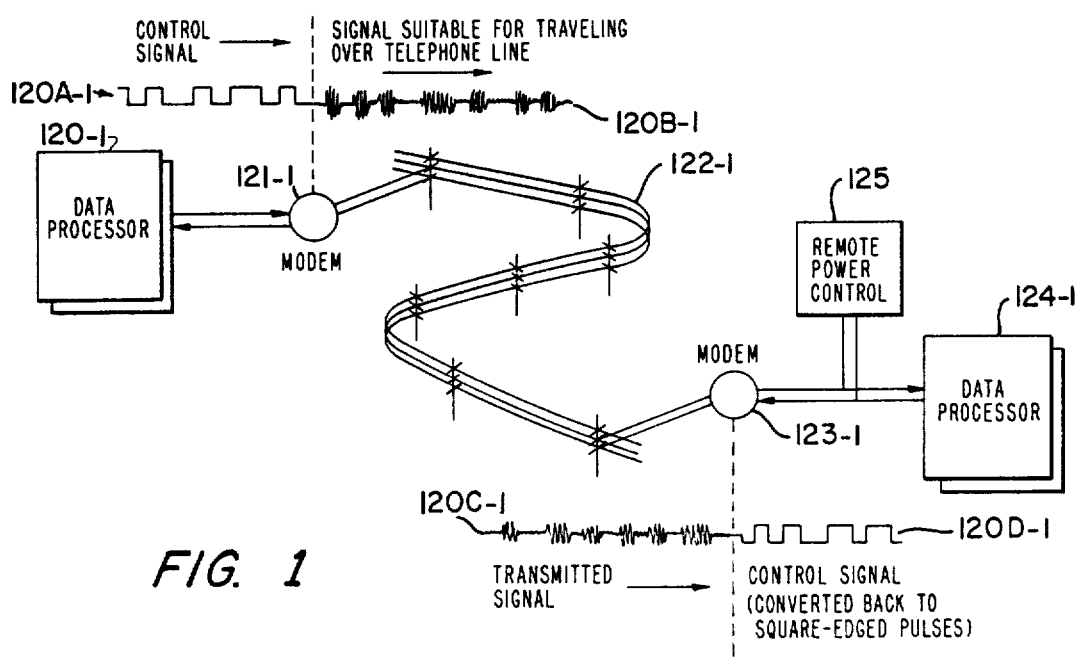
FIG. 1 is a diagrammatic overview of a computer system utilizing a telephone or telegraph wire for communication.
Figure 1A:
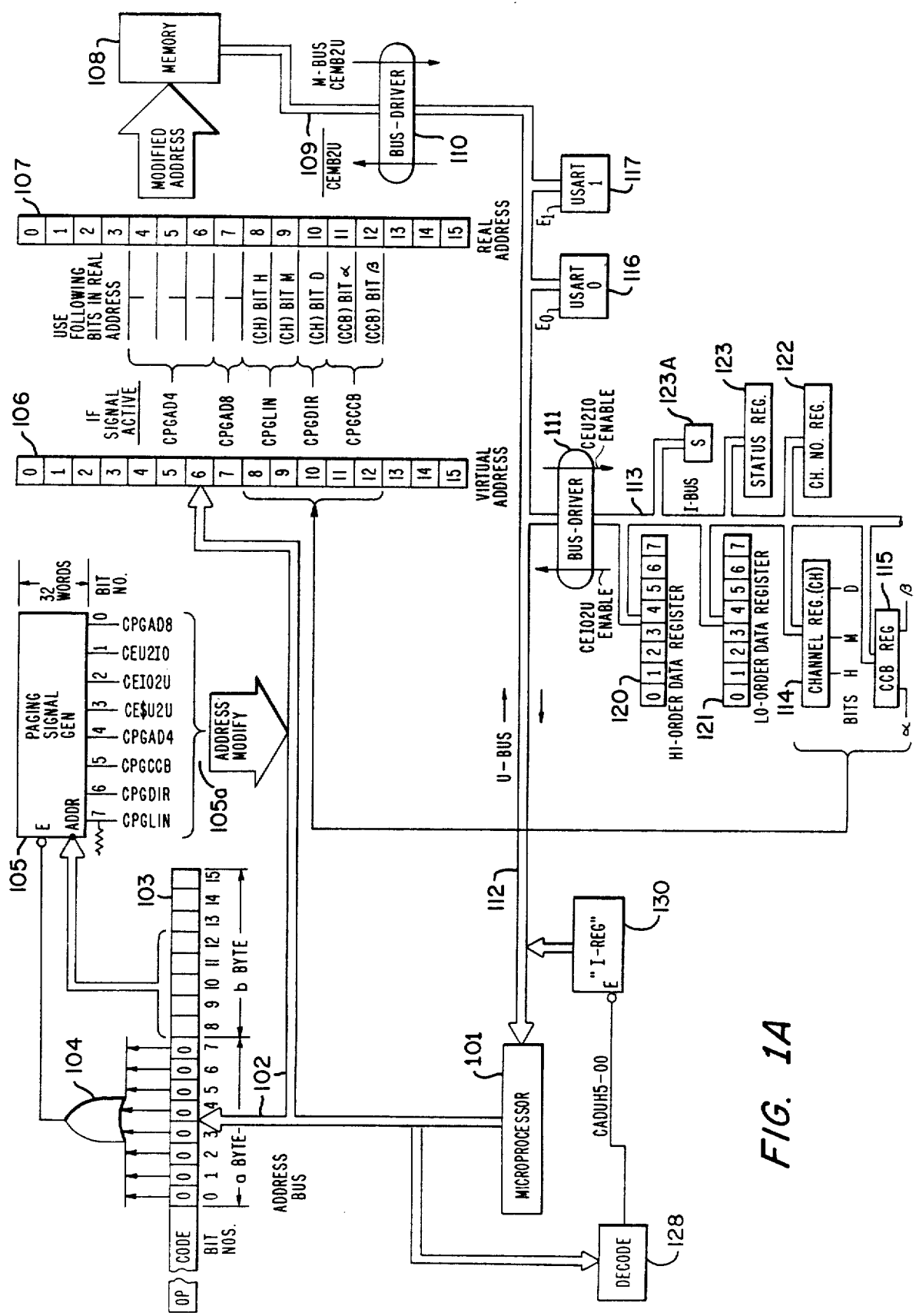

FIG. 1 shows a block diagram of a typical computer communication system utilizing the invention. The standard interface transmission control unit between the modem and the data processor has not been shown in this diagram for simplicity. Communication can be automatically established by lifting the phone off the receiver and dialing the remote site location. Once telephonic communication has been established with remote site location, typical digital control signals 120A-1 are sent by the data processor 120-1 where they are transformed into typical analog signals suitable for traveling over communication lines 122-1 via modem 121-1. These signals are then transmitted by communication lines 122-1 to modem 123-1 where they are transformed from the analog type signals 120C-1 to the digital type 120D-1 and are received in the remote power controller 125 which then performs further operation (to be more fully described infra).

Referring now to FIG. 1AA, there is shown a prior art computer communication system with which this invention may be practiced. With this type of system, the remote site computer 107-1 must be powered continuously irrespective of whether or not the central site computer 101-1 is transmitting or not. In order to transmit data in this prior art computer communication system, the computer 101-1 dials the telephone number of the remote site computer 107-1 via automatic dialing unit 103-1; of course, manual dialing could also be utilized. Dial signals to the modem 106-1 through the modem 104-1 result in line control signals being applied to a transmission control unit 120-1 in order to start the dialog to transmit data. Transmission control unit 102-1 is a standard interface between a modem 104-1 and a computer 101-1 and is referred to as the EIA RS-232-C (Electronic Industries Association) Standard. These standard interface units receive, generate and send various signals as follows:

1. Data signals (a) Transmitted Data (to the modem). Data generated by the terminal or computer for transmission.
(b) Receive Data (to the terminal or computer). Data received by the modem for the terminal.

2. Timing Signals (a) Transmitter Signal Element Timing

Two connections are defined. One sends signal element timing information from the transmitting terminal for computer system to its modem. The other sends timing information from the transmitting modem through its terminal or computer.

(b) Receiver Signal Element Timing

Two connections are defined. One sends signal element timing information from the receiving terminal to its modem or computer system. The other sends timing information from the receiving modem to its terminal.

The timing signal connections are optional. A modem for Start-Stop transmission does not use them.

3. Control Signals (a) Request to Send (to the modem)

Signals on this connection are generated by the transmitting terminal when it wishes to transmit. The modem carrier signal is transmitted during the on condition of this connection. (With half-duplex operation, the off condition of this connection holds the modem in the receive-data state.)

(b) Clear to Send (to the terminal or computer system)

Signals on this connection are generated by the transmitting modem to indicate that it is prepared to transmit data. They are a response to the request to send signal from the transmitting device. (With full-duplex operation, the modem is in the transmit state at all times.)

(c) Data Set Ready (to the terminal or computer)

Signals on this connection are generated by the local modem to indicate to the transmitting machine that it is ready to operate.

(The following control signals are optional.)

(d) Data Terminal Ready (to the modem)

When the terminal or computer system sends the on condition on this connection, it causes the modem to be connected to the communication line. The off condition causes it to be disconnected in order to terminate a call or free the line for a different use.

(e) Ring Indicator (to the terminal)

A signal on the connection informs the terminal that the modem is receiving a ringing signal from a remote location.

(f) Data Carrier Detector (to the terminal)

A signal on this connection indicates to the terminal that the carrier (the sign wave that carries the signal) is being received. If the carrier is lost because of a fault condition on the line, the terminal will be notified by an off condition in the connection.

(g) Data Modulation Detector (to the terminal)

An on condition on this connection informs the terminal that the signal is being demodulated correctly by the modem. When the quality of the modulation drops below a certain threshold, the terminal may take effective action such as requesting retransmission or requesting that a lower transmission rate be used.

(h) Speed Selector

There are two speed selector connections: one to the modem and one to the terminal. Using them, the transmission rate may be changed.

4. Grounds (a) Protective Ground

Attached to the machine frame and possibly to external grounds.

(b) Signal Ground

Establishes the common ground referenced potential for the circuits. When line communication has been established between the central site computer 101 and the modem 104, transmission of data proceeds after the modem has translated the data in a form capable of being transmitted over communication line 105. The data is received by modem 106 which retranslates the data to digital format and transmits it to the receiving computer 107.

Referring now to FIG. 1A, there is shown a logic block diagram of a preferred embodiment of the invention which also shows information flow and modification of the information for improved addressing. A microprocessor 101 is typically a type 6800 commercially available from Motorola Inc. and utilizes a 16 bit address bus 102 to address main memory 108. (The 6800 is described in "The Complete Motorola Microcomputer Data Library", Series A, Motorola Inc. 1978 by Motorola Semiconductor Products, Box 20912, Phoenix, Ariz.) This provides an addressing capability of over 64,000 bytes of main memory 108. The formats of the instruction are shown on FIG. 1B. There are primarily two formats: one having an eight bit op code and an 8 bit (a) byte whereas the other one has an 8 bit op code, and 8 bit (a) byte and an 8 bit (b) byte. In order to conserve space and cycle time, it is more advantageous to use only the (b) byte. Accordingly, in the schematic representation of FIG. 1A, the register 103 utilizes the first 5 high order bits 8, 9, 10, 11, and 12 to address the paging signal generator 105. (The paging signal generator is an integrated circuit memory chip of the type designated as 5610 and commercially available from Intersil Inc. The 5610 is described in the "Intersil Semiconductor Products Catalog" by Intersil Inc., 10900 North Tantau Avenue, Cupertino, Calif., published October, 1974.). The paging signal generator 105 stores 32 words which can be addressed by bits 8-12 of the (b) byte. Since 5 bits are utilized to address the paging signal generator, they can be utilized to address any of the 32 words therein. The internal circuitry of the generator 105 is such so that when the first 8 words (up to address 07) are addressed, signal CPGLIN is activated (i.e., goes low). When the next four words of the signal generator 105 are addressed (i.e., addresses 8-11), then both signals CPGLIN and CPGDIR are activated. When the next location word 13 (i.e., address 12) is addressed, then all of the following signals are activated (i.e., go low) CPGLIN, CPGDIR, CPGCCB and CPCAD4. The paging signal generator 105 is enabled when a low output signal from the microprocessor 101 is present at its E input terminal. A low input signal is provided to the E input terminal of paging signal generator 105 from the output of OR gate 104 when all of its inputs bits 1-8 of (a) byte are 0 or low. These bits 1-8 of (a) byte are made 0 when it is desired to modify the 16 bit address provided by the (a) and (b) byte. Accordingly, when all the bits of the (a) byte are 0, a low signal results at the output of OR gate 104 which is applied to the E input terminal of paging signal generator 105 thus enabling it. When the paging signal generator 105 is enabled one of the control signal locations 105a are addressed by bits 8-12 of (b) byte. When selected ones of these control signals 105a are active (i.e. low), the 16 bit virtual address 106 is modified to the real address 107 which then addresses main memory 108. If none of the control signals 105a are active, then the 16 bit address 106 is identical to the 16 bit address 107 and no modification occurs for addressing memory 108. (The mechanism for performing this modification will be discussed in detail in relation to FIG. 3.) Assuming, therefore, that control signals CPGCCB is active, then bit 11 of the virtual address is replaced by the bit in position α of CCB register 115 and bit 12 will be replaced by bit β in CCB register 115 to form the real address. If control signal CPGDIR is active, then bit 10 of the virtual address is replaced by bit D of channel register 114. If control signal CPGLIN is active, then bit 9 of the virtual address is replaced by bit M of the CH register 114, and bit 8 of the virtual address is replaced by bit H of the CH register 114. If control signal CPGAD8 is active, then bit 7 of virtual address is replaced by a one. Finally, if control signal CPGAD4 is active, then bits 4, 5, 6 of the virtual address are replaced by a one.

The CESU2U control signal generated by the paging signal generator 105 is utilized to address the line number of a selected Universal Synchronous Asynchronous Receiver Transmitter (USART) 116, 117. (USART's are commercially available from Intel Corporation and are of the type Programmable Communications Interface 8251A. The 8251A is described in the "Intel Component Data Catalog 1978" published by Intel Corporation, 3065 Bowers Avenue, Santa Clara, Calif.). The CEIO2U control signal enables the I-bus 113 via bidirectional bus driver 111. (These bidirectional bus drivers are commercially available from Texas Instruments and are designated as type 74LS246). The 74LS245 is described in "The TTL Data Book for Design Engineers", Second Edition, copyright 1976 by Texas Instrument. The CEIO2U signal permits communication from the I-bus 113 to the U-bus 112, whereas a CEU2IO signal permits communication from the U-bus 112 to the I-bus 113. The I-bus may have various registers attached for storing communications information. Some typical registers such as HI-Order Data Register 120, LO-Order Data Register 121, channel no. register 122, and status register 123. These registers communicate with the microprocessor via the I-bus 113 and the U-bus 112, and with main memory 108 via I-bus 113 and M-bus 109. In order for the various registers on the I-bus 113 to communicate with main memory 108 and microprocessor 101, it is necessary to assign space in main memory for various lines and channels associated with any communication port. Referring therefore to FIG. 2A, it will be seen that real memory 200 has a portion of its area reserved for lines 0–3. Each line is comprised of 64 bytes and the total 4 lines 0–3 comprise the Logical Table (LCT) space. Each line 0–3 is furthermore subdivided into 2 channels of 32 bytes each. Accordingly, there are 8 channels of 32 bytes, comprising 4 lines of 64 bytes each which comprise the LCT space. The next 256 bytes are reserved for Channel Command Programs (CCP) use. There are also 3 to 4K bytes which together with the unused space are reserved for Channel Command Programs (CCP). Below this space there is an additional 256 bytes reserved for the Channel Control Block (CCB). As with the LCT space, each line 0–3 is associated with one CCB of 64 bytes, each of which is subdivided into 2 channels of 32 bytes each. Below this is memory space reserved as firmware work space. Accordingly, it can be seen that each line 0–3 is associated with one LCT space and one CCB space, each of which is subdivided into two channels. Part of the addressing mechanism described supra with FIG. 1A addresses all of these memory spaces. However, to do this it takes two address bytes a and b since one address byte is comprised of 8 bits and 8 bits can address only 256 locations. Yet as can be seen from FIG. 2A, there are 768 locations (3×256) excluding the 3K/4K locations. These 256 locations are the most commonly addressed since communication of lines 0–3 must constantly be had with its LCT's, its CCB's and the firmware. It is very inefficient to utilize the 16 bit address which can normally address over 64,000 locations merely to address 768 locations, yet only one 8 bit address can address only 256 locations. This invention permits the 768 locations to be addressed by the first 5 bits 8–12 of the (b) byte 103 by permitting the modification of the virtual address of FIG. 2B as discussed supra. Hence cycle time and storage space are saved by this short form of addressing.

Referring to FIG. 1C, there is shown the map of the paging signal generator 105 (i.e., Paging PROM 300). The map is self-explanatory. The address locations are shown in various numbering systems on the first 3 columns, whereas the last column contains the actual information stored at that address location. The fourth column designates the hexadecimal locations which have similar contents.

Referring to FIG. 2B, there is shown 256 locations in memory 201 reserved for virtual memory. The first 64 locations or bytes are numbered in decimal notation 0 through 63 and in hexadecimal notation 0 through 3F, and comprise the LCT of the current line used by the CCP. The next 32 locations or bytes, decimal locations 64-95 and in hexadecimal notation 4O-5F, are reserved for the LCT of the current channel used by firmware. The next 8 locations or bytes denoted in decimal notation 96-102 and in hexadecimal notation 60-67 are reserved for the active CCB of the current channel. There is then an unused space and there are 3 eight byte locations reserved for the USART of the current line, the shadow USART of the current line respectively and the extension of LCT of the current channel.

A typical example will illustrate how the improved addressing scheme of the invention works. Assume, therefore, that location 5 of line 0 of virtual memory 201 is to be addressed. Accordingly, all of the bits 0 through 7 of (a) byte of register 103 would be 0 which would enable OR gate 104 and enable the paging signal generator 105. The next 5 bits, 8 through 12, would also be 0, whereas bit 13 would be a 1, bit 14 would be 0 and bit 15 would be a one thus giving the binary address 101 or decimal 5. The virtual address 106 would also have bits 0 through 12 equal to 0 with bit 13 being 1, bit 14 being 0 and bit 15 being 1. Additionally, however, since bits 8-12 of the (b) byte in register 103 are 0, control signal CPGLIN would be active. (It was seen supra that if bits 8-12 were utilized to address the first 8 words in the paging signal generator 105, signal CPGLIN would be active or low.) With signal CPGLIN active, bits 8 and 9 of the virtual address 106 would be replaced by bits H and M respectively of channel register 114. Under our assumption, which initially was that we are addressing location 5 of line 0, bits H and M of channel register 114 would be 0 and accordingly bits 8 and 9 of real address 107 would also be 0. Thus the final real address would have bits 0-12 equal to 0, bit 13 would be a 1, bit 14 would be a 0, and bit 15 would be a 1, thus addressing the fifth location of line 0 of real memory.

To take this problem one step further, assume now that the fifth location in line 1 is now to be addressed. The bit contents of register 103 and virtual address 106 would be identical as in the prior example. However, since line 1 is now being addressed the channel register 114 would have a 0 in its high order bit H and a 1 in its next order bit M. Accordingly, when signal CPGLIN is activated once again (since bits 8-12 of the (b) byte of register 103 are all zeroes) bit 8 of virtual address 106 would be replaced by bit H of channel register 114 which is a 0. Bit number 9 of virtual address 106 would be replaced by the mid bit M of channel register 114 which in this example is a 1, since line 1 is being addressed. Hence the real address 107 would have zeroes in bit positions 0 through 8, bit 9 would be a 1, bits 10-12 would remain 0, and bit 13 would still be a 1, bit 14 would still be 0, and bit 15 would still be a 1. Accordingly, now hexadecimal location 45 is addressed in real memory which is the fifth location of line 1. It can readily be seen by this reasoning that at location 5, line 2 or line 3 could be similarly addressed merely by substituting bits H and M of the channel register 114 for bits 8 and 9 of the virtual address 106 to obtain the real address 107.

Figure 3:
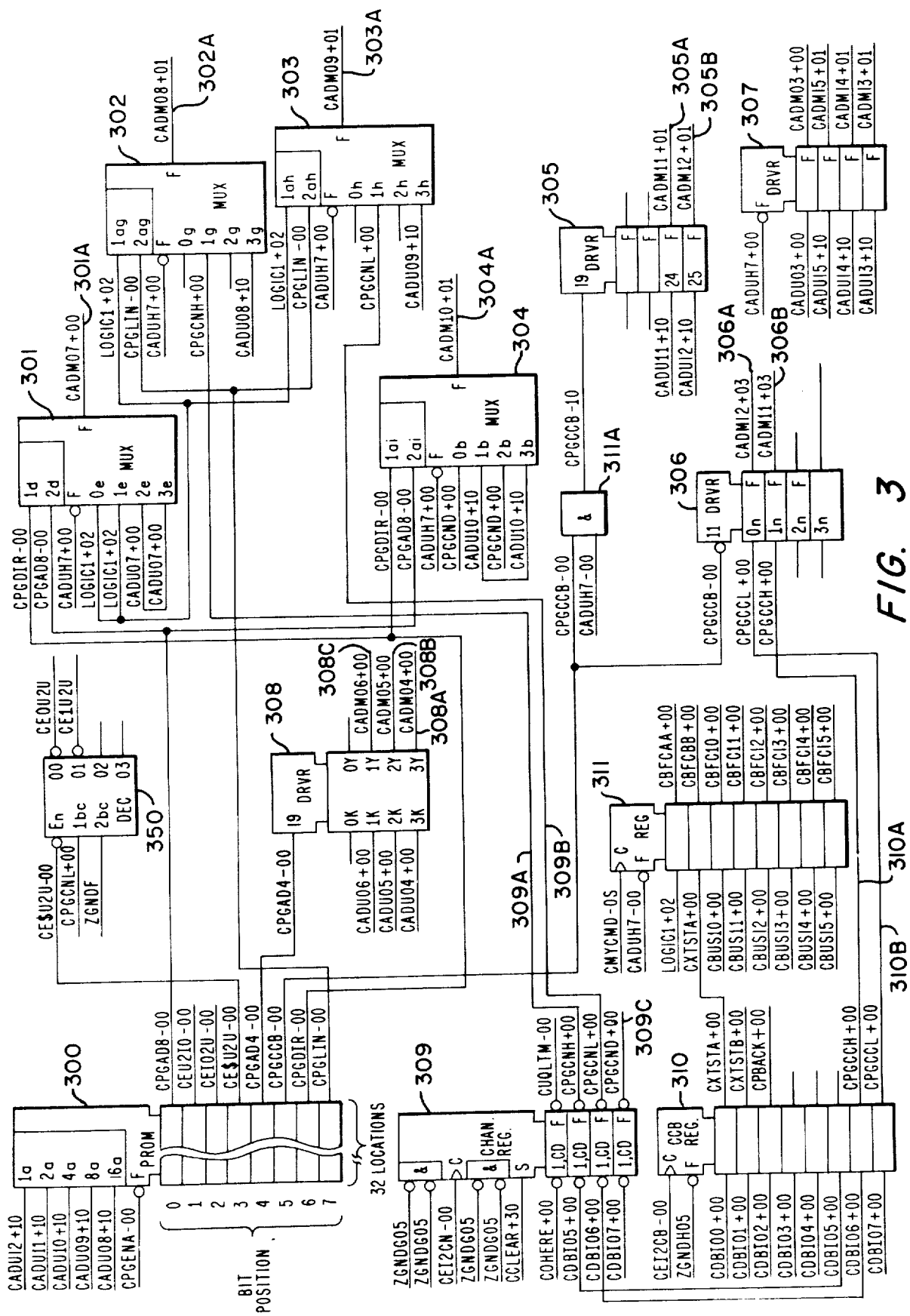

Referring to FIG. 3, there is shown the detailed logic block diagram of the paging apparatus for improved mapping of virtual addresses to real addresses. First, a structural description will be given wherein the various structures of FIG. 3 will be identified and tied into FIG. 1A where feasible; secondly, the operation of the structure of FIG. 3 will be described to show the various functions performed. It should be noted from FIG. 1A supra that the paging mechanism is designed to modify bits 4 through 12 of virtual address format 106 to provide the final real address 107 with bits 4 through 12 either modified or not in accordance with the signals presented. On FIG. 3 it should be noted that multiplexers (MUX) 302, 303 and 304 and driver 305 provide the output signals respectively on lines 302A, 303A, 304A, 305A and 305B which represent modified bits 8 through 12 of the real address 107. Multiplexer (MUX) 301 and driver 308 provide the output signals in line 301A, 308A, 308B, and 308C which represent bits 4 through 7 of the modified real address 107. Register 309 corresponds to register 114 of FIG. 1A and stores bits H, M and D and provides these bits as output signals on lines 309A, 309B and 309C. Register 310 corresponds to CCB register 115 on FIG. 1A and stores and provides the α and β bits as signal outputs on lines 310A and 310B respectively. PROM 300 corresponds to paging signal generator 105. As described supra, it provides the various signals for mapping the virtual address 106 into the real address 107. The map PROM 300 corresponds to FIG. 1C. Drivers 305 and 306 are coupled with AND gate 311A to provide the real memory address bits 11 and 12. Register 311 is utilized to store various signals.

Each of these devices is commercially available from such manufacturers as Texas Instrument, Motorola, Intel and other semiconductor manufacturers in accordance to their universal designations as shown in Table I below.

TABLE I

| Type of Device and Numeral Designation | Commercial Identification Number |
|---|---|
| MUX301, 302, 303 & 304 | 74LS253 |
| Drivers 305, 306, 307, 308 & 370 | 74LS241 |
| Registers 309, 114 | 74173 |
| Registers 120, 121, 115, 122, 123, 123A, 310, 311, 360, 361, 370 & 700 | 74LS374 |
| AND gates 311A, 354, 358A, 371 & 372 | 74LS08 |
| PROM 300 | 5610 |
| Decoders 351, 352, 353, 355, 356, 357 & 380 | 74LS139 |
| Comparators 358 & 358B | 74LS08 |
| USART 116, 117 | |
| BUS DRIVERS 110, 111 | |

The 74 series circuits are listed in "The TTL Data Book for Design Engineers", Second Edition, copyright 1976 by Texas Instrument. The 5610 is listed in the "Intersil Semiconductor Products Catalog", published in 1974 by Intersil Inc.

Referring once again to FIG. 3, the operation and function of the paging apparatus for improved mapping of virtual addresses to real addresses will be described in greater detail. As has been discussed supra with respect to FIG. 1A, when addresses O through 7 of PROM chip 300 are addressed the communication paging line signal (CPGLIN) becomes active by going low. This is shown on the Paging PROM Map of FIG. 1C, wherein the contents of the map in the first 8 positions are 01111111. Bit position 7 is 0, or low, which activates signal CPGLIN. This signal is then applied to input terminals 2 of multiplexers (MUX) 302 and 303 respectively. The other input control signal to input terminals 1 of multiplexers 302 and 303 respectively is the logic 1 (LOGIC1) signal which is wired to always be high. When signal CPGLIN is active (i.e., in the low state,) it addresses input terminals lag and lah of multiplexers 302 and 303 respectively which means that the signals on input terminals 1g and 1h will pass through as outputs on lines 302A and 303A respectively. By following the signals (CPGCNH) on input terminal 1g of multiplexer 302 back to its source, it will be observed that it comes from the high order bit on line 309A of channel register 309. Similarly, following the input signal (CPGCNL) on input terminal 1h of MUX 303 back to its source shows that it comes from the middle order output line 309B. These correspond to bits H and M of channel register 114 of FIG. 1A. Accordingly, when the line paging signal (CPGLIN) is activated, the H and M bit of register 114, 309 is substituted for virtual address bits 8 and 9 on output lines 302 and 303 respectively. Conversely, when the line paging signal (CPGLIN) is not activated (i.e., high,) then the address bits 8 and 9 of the virtual address are not modified and are passed as is to the output lines 302A and 303A of MUX's 302 and 303 respectively. This occurs because when CPGLIN is high and with LOCIC1 always being high, input address 3g and 3h are addressed on MUX's 302 and 303 respectively. Input address 3g of MUX 302 is CADU08 which is interpreted as the communication address of the microprocessor bit 8. Input address 3h of MUX 303 is CADU09 which is interpreted as the communication address microprocessor bit 9. When input terminals 3g and 3h are addressed, this becomes active and permits the addresses on that terminal to pass through to the output lines of 302A and 303A of MUX's 302 and 303.

The next control bit for modifying the virtual address 106 from the PROM chip 300 is the directional bit (CPGDIR). The directional bit is the low order bit D in channel register 114 and on line 309C of channel register 309. The directional bit becomes activated when addresses 8, 9, 10 and 11 (decimal) of the PROM 300 are addressed (See FIG. 1C). Additionally, when these bits 8–11 are addressed output signal CPGLIN also becomes active. Accordingly, in addition to the application of the CPGLIN signal to MUX's 302 and 303, there is an application of signal CPGDIR on input terminals 1d and 1ai of MUX's 301 and 304 respectively. With signal CPGDIR on input terminal 1ai of MUX 304 low, it makes no difference whether input signal CPGAD8 on input terminal 2ai of MUX 304 is high or low, since under either condition either input terminal 0b or 2b (addresses 00 or 10 binary) are activated and the CPGCND signal is applied to both these addresses. The origin of the CPGCND signal is from the output line 309C of channel register 309 which is the D bit of channel register 114 and channel register 309. Accordingly, when the directional bit CPGDIR is activated the number 10 (decimal) bit of virtual address 106 is modified in accordance to the contents of the D bit of the channel register 114 or 309. There is no effect of the CPGDIR signal on the 1d input terminal of MUX 301 unless CPGAD8 signal is also activated. This is true because with signal CPGAD8 inactivated or high, only addresses 2e or 3e (10 of 11 binary) or MUX 301 can be addressed. They are both the same and represent bit 7 of the communication address of the microprocessor. However, when the CPGAD8 signal from PROM 300 is also activated (i.e., low,) then only address 0e or 1e (00 or 01 binary) of MUX 301 is addressed and becomes active; both these addresses have the logic signal 1 LOGIC1 applied which is permitted to pass to output line 301A of MUX 301 when both signal CPGAD8 and CPGDIR ae active or only when CPGAD8 is active.

Hence with CPGAD8 active, bit 7 of virtual address is modified and forced to a one.

As described supra with respect to FIG. 1A, when the channel register bit (CPGCCB) is active or low then bits 11 and 12 of virtual address 106 are replaced by channel bits $\alpha$ and $\beta$ of register 115. Since register 310 on FIG. 3 corresponds to channel register 115, and bit CPGCCH on output line 310A corresponds to the $\alpha$ bit of channel register 115, and bit CPGCCL on output line 310B corresponds to the $\beta$ bit of register 115, then these bits will replace bits 11 and 12 of the virtual address when the signal CPGCCB is active or low. Let's see how this happens. When the signal CPGCCB is activated, it is applied to the 11 input terminal of driver 306 and to the 1 terminal of AND gate 311A. Accordingly, driver 306 is enabled and the channel control bit signals CPGCCH and CPGCCL on output lines 310A and 310B are applied to terminals 1n and 0n respectively of driver 306. They pass through to output line 306A and 306B of driver 306 and replace bits 11 and 12 of the virtual memory address. It should be noted that when the CPGCCB signal applied to input terminal 1 of driver 306 is low, it enables driver 306; but this same signal applied to the input terminal 19 of driver 305 disables driver 305. Hence the CADU11 and CADU12 signals on input terminals 24 and 25 respectively of driver 305 are not passed through to the output terminal 305A and 305B of driver 305, but rather are replaced by channel register 310 bits as previously described. Accordingly, it is seen that either driver 306 or 305 is enabled but not both, and either the channel register bits are passed through via driver 306 or the microprocessor address bits are passed through to the output via driver 305.

Finally, with respect to the virtual address modification, the modification of bits 4, 5 and 6 will be discussed. As noted supra with respect to FIG. 1A, this is accomplished via signal CPGAD4. When address 12 (decimal) of the paging signal generator is addressed, all of the following signals become active: CPGLIN, CPGDIR, CPGCCB and CPGAD4. This is seen by referring to FIG. 1C where address 12 (decimal) contains the following 00001111. Hence, bit positions 4, 5, 6 and 7 are low or active and from FIG. 1A ref. numeral 105; these correspond to signals CPGAD4, CPGCCB, CPCDIR and CPGLIN respectively. It has already been shown how the first three signals modify the virtual address when they are active, and it will now be shown how the signal CPGAD4 modifies the virtual address and forces one's into bits 4, 5 and 6 of the virtual address. The CPGAD4 signal is applied to the enabling terminal 19 of driver 308. When driver 308 is not enabled (i.e., low,) then one's are forced for bits 4, 5 and 6 respectively. If it is enabled (i.e., high), then the microprocessor address CADU 4, 5 and 6 respectively will pass through. The reason for this is that driver 308 is a commercially available LS241 tri-state circuit which has pull up resistors for the signal applied. Accordingly, if a low signal such as CPGAD4 is applied, it does not enable driver 308 and the output signals are pulled up to +5 volts making it a logic 1. On the other hand, when CPGAD4 is not active it is high, thus it enables driver 308 and permits the address signal on input terminals 1k, 2k, and 3k respectively of driver 308.

Figure 7:
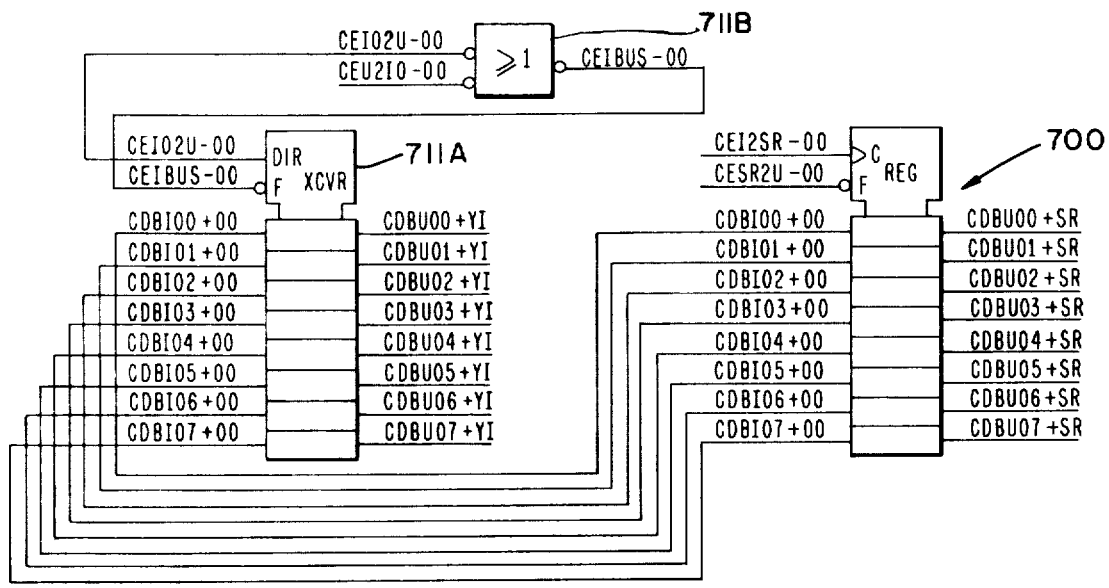

Not only does the paging signal generator 105 on FIG. 1A and its equivalent PROM 300 on FIG. 3 generate signals that can more efficiently address memory 108, but it further generates signals which provide more efficient addressing and communication between main memory 108, the microprocessor 101 and various registers and peripherals attached to the I-bus and U-bus. This communication between various devices such as register, memory to register, utilizing the U-bus and the I-bus is initiated by activating signal CEU2IO (i.e., signal CEU2IO is low and represented on FIG. 1C by a zero). It should be noted that signal CEU2IO is bit position number 1 on paging signal generator 105. Now referring to FIG. 1C, which is the map of paging signal generator 105 and its equivalent PROM 300, it should be noted that there are 3 addresses where there is a zero stored at bit position number 1. They are decimal locations 18, 21 and 22 or virtual address hexadecimal locations 90, A8 and B0. Accordingly, when any of these locations of paging signal generator 105 or PROM 300 are addressed by the microprocessor 101, signal CEU2IO will become active or low. Signal CEU2IO initiates the communication process and controls the enabling of the bus driver 111 on FIG. 1A and 111A on FIG. 7 by means of an OR gate 711B. It is also applied as one input to AND gate 354 of FIG. 4 and guarantees a pulse out after the data becomes valid on the bus.

Figure 4:
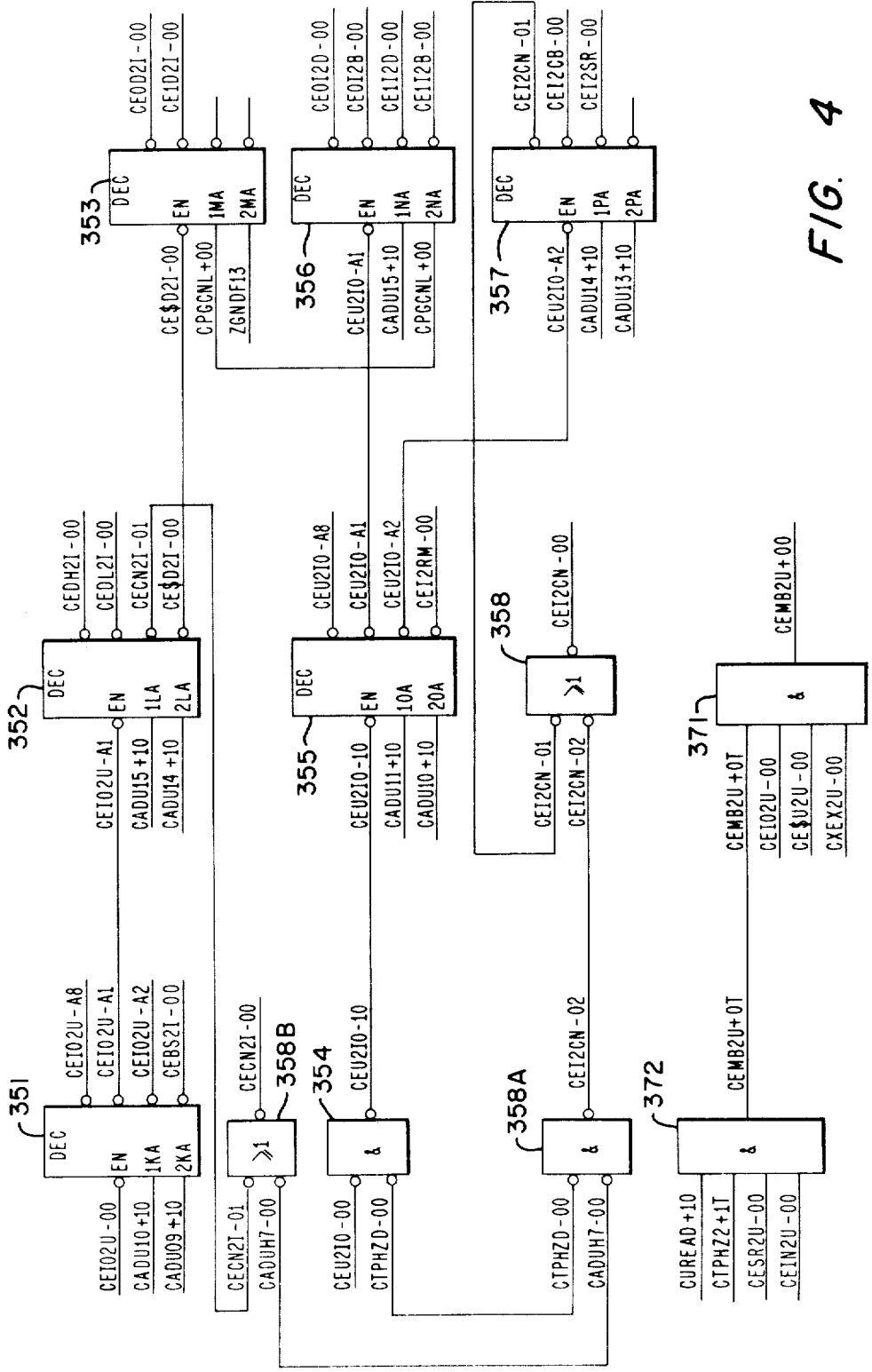

Referring to FIG. 3 and 4, a signal CEU2IO is generated at bit position 1 of PROM 300 when it is desired to enable the I-bus driver 711A to cause data to be driven from the U-bus to the I-bus and written into either the channel register 114, the CCB register 115 or the S register 123A. Referring to FIG. 4, it will be noted that the signal CEU2IO is applied to one input terminal of AND gate 354 and is AND'ed with a strobe signal CTPHZD to generate the CEU2IO-10 signal at the output of AND gate 354. This signal is then applied to the enabling input of decoder 355. Also applied to input terminals 20A and 10A respectively of decoder 355 are bits 10 and 11 of the address 103 of the communication address unit. These bits are then decoded so as to activate one of four signals on the output terminals of decoder 355. When bits 10 and 11 on the input terminals 20 and 1 and 0 of decoder 355 and 10 respectively or decimal 2, then the output signal CEU2IO-A2 is enabled and is applied to the enable terminal of decoder 357. Additionally, bits 13 and 14 of the communication address unit (i.e., signals CADUI3 and CADUI4) are applied to input terminals 2PA and 1PA respectively of decoder 357. When both these bits 13 and 14 are 0, the zero output terminal of decoder 357 is enabled. Signal CEI2CN is activated through a NOR gate 358 and utilized to write into channel register 114 on FIG. 1A and channel register 309 on FIG. 3. On the other hand, if bits 13 and 14 are 0 and 1 respectively and are applied as signals CADU13 and CADUI4 to input terminals 2PA and 1PA respectively of decoder 357, then the 01 output terminal of decoder 357 is enabled and signal CEI2CB becomes active and is utilized to address CCB register 115 on FIG. 1A and CCB register 310 on FIG. 3. Finally, if bits 13 and 14 applied as signals CADU13 and CADU14 on input terminals 2PA and 1PA respectively of decoder 357 are 1 and 0 or decimal 2, then the 02 output terminal of decoder 357 becomes enabled and signal CEI2SR becomes active and is utilized to address the S register 123A. Thus signal CEU2IO is utilized to enable the bus driver 111 and address registers 114, 115 and 123A. Accordingly, when the microprocessor 101 executes a write instruction, directing it to write the microprocessor's accumulator into location A8 hexadecimal, the microprocessor places the contents of the microprocessor's accumulator on the U-bus and enables bus driver 111 in a write direction which is then strobed into the appropriate register address.

When a write instruction is being executed and information is being written into any of the registers on the I-bus, bus driver 110 on FIG. 1A also enables the M-bus 109 and the same information written into the address register is also written into a section of memory 108 which is addressed. (See also FIGS. 2A and 2B.) Bus driver 110 is enabled by the lack of signal CEMB2U and enables the M-bus in the direction of the memory 108. Hence the information written into the registers is also written into a "shadow memory" which preserves the information for diagnostic purposes or for debugging, and provides a place to preserve data when remote maintenance is performed.

In reading data from the I-bus to the U-bus it is necessary to inhibit transfers of data from the M-bus to the U-bus. This allows the I-bus to control the data onto the U-bus. This function is performed by generating the signal CEIO2U in paging signal generator 105. This signal is then applied to the enable terminal of decoder 351 on FIG. 4, and at the same time bits 9 and 10 of the address 103 are applied to input terminals 2KA and 1KA respectively as signals CADU09 and CADU10. These signals undergo a first level of decode to provide an output signal CEIO2U-A1 on output terminal 01 of decoder 351 when the input bits 9 and 10 are 0 and 1 respectively. The CEI02U-A1 signal is then applied to the enable input terminal of decoder 352 along with bits 14 and 15 on input terminals 2LA and 1LA respectively. Depending on the binary value of bits 14 and 15, 1 of 4 subcommand signals will be generated at the output terminals of encoder 352. When bits 14 and 15 have 0 values (which is equivalent to addressing location hexadecimal A8 is virtual memory space), a subcommand CEDH2I00 is generated at the 00 output terminal of decoder 352. That signal is then applied to the enable terminal of register 360. Register 360 corresponds to the HI-order data register 120 of FIg. 1A. Accordingly, signal CEI02U provides a means for reading data from the high order register 120 into the I-bus and onto the U-bus. However, since bus driver 110 has been inhibited by the presence of signal CEMB2U the memory space addressed by the address 103 is not read and only the high order register 120 is read. In a similar manner, low order data register 121 is read when bits 14 and 15 are 01 respectively thus addressing output terminal 01 of decoder 352. Hence the signal CEDL2I-00 is generated which is applied to the enable terminal of register 361 on FIG. 4A. Thus it is seen that registers 360 and 361 of FIG. 4A correspond to registers 120 and 121 respectively of FIG. 1A.

Bus driver 110 of FIG. 1A corresponds to driver 370 of FIG. 4B. This is a bidirectional driver and can drive data either from the memory bus 109 to the U-bus 112 or vice versa. The direction of data transfer is controlled by the signal CEMB2U. When the signal is asserted, data is permitted to flow from the memory bus 109 to the microprocessor bus 112. When it is not asserted, it permits data transfers in the other direction. The CEMB2U signal is generated via AND gates 371 and 372 of FIG. 4. These AND gates represent a simple AND'ing operation of various signals such as the microprocessor read CUREAD, the strobe signal CTPHZ2 and the communication enable signals CESR2U and CEIN2U. They generate the CEMB2U signal which is then applied to one input terminal of AND gate 371. It should be noted when a transfer operation from the I-bus to the U-bus is being made. In other words, a read operation from a register on the I bus to the U-bus, then that signal would be high on the input of AND gate 371, and if the remaining signals are also high, the CEMB2U signal is high. When this high signal is applied to the input terminal of driver 370 of FIG. 4B, it would inhibit information passing through via bus driver 110 from the I bus to the M bus.

Referring now to FIGS. 1A, 1C and 4, the addressing of USART's 116 and 117 will be disclosed. The signal that initiates this addressing procedure is CE$U2U which appears as bit 3 from the paging signal generator 105 of FIG. 1A. It should be noted from FIG. 1C that the only address containing a 0 at bit number 3 is hexadecimal 66. Accordingly, when this location is addressed, bits 0, 3, 4 and 7 will become active. As noted previously, bit 3 provides the signal CE$U2U which is applied to the enable terminal of decoder 350A of FIG. 4, and participates in the decoding of the middle bit of channel number CPGCNL. Depending on the value of that bit, one of two output signals CEOU2U and CE1U2U on output terminal 0 and 1 respectively of decoder 350 will become active. When CEOU2U is active, USART 116 is enabled, whereas when CE1U2U is active, USART 117 is enabled. When information is written on the enabled USART, it is also written into that portion of memory addressed by address 103. This type of dual addressing utilizes two virtual addresses which are converted into the same physical address to provide a duplicate address or shadow of the physical device actually being addressed. For example, we have shown how address 88 hexadecimal addresses the physical USART by providing an enable signal for the appropriate USART. Referring to FIG. 1C again, it will be noted that address C8 hexadecimal has the same binary map as address 88 hexadecimal with one exception: that is bit number 3 of address hexadecimal 88 is 0 or active, whereas bit 3 of address hexadecimal C8 is 1 or inactive. Accordingly, it is seen that with the exception of the third bit, address hexadecimal 88 provides the same signals as address hexadecimal C8 and thus C8 can be regarded as the shadow of the particular USART being addressed when the signal CE$U24 is provided at address hexadecimal 88. Hence it can be seen that address hexadecimal 88 or decimal 17 addresses the actual USART data whereas address hexadecimal C8 or decimal 25 addresses its shadow. Accordingly, when we write into address hexadecimal 88, it is written in the USART and the appropriate memory space addressed by memory space hexadecimal C8 in accordance with the principles discussed supra. Let's see how this happens by a typical example. First, we shall address paging signal generator 105 decimal location 17. Utilizing address format 103, the address will be as follows: 00000000000. It should be noted that bits 8 through 12 which do the actual addressing contain the decimal number 17 in binary format. Referring to FIG. 1C, it will be noted that decimal location 17 will have bits 0, 3, 4 and 7 active. Bit 0 generates signal CPGAD8 on paging signal generator 105, and this signal when active forces bit 7 to a 1. Bit 3 is the signal that addresses the USART and does not participate in changing the virtual address to a real address. Bit 4 of paging signal generator 105 is CPGAD4, and when this is active forces bits 4, 5 and 6 to a 1. Finally, bit 7 of paging signal generator 105 when active provides the signal CPGLIN and forces the high order bit and the middle order bit of the channel register into bit positions 8 and 9 of the real address. Assuming for the purposes of this example that those bit positions are 0, then bits 8 and 9 would be 0 and the final real address would be 0000111110000000. Now when decimal address 25 is addressed, the address format 103 would take the form 0000000011001000. Again it will be noted from FIG. 1C that the following signals would be active, CPGAD8, CPGAD4 and CPGLIN. Since the signal CE$U2U which was also present in the previous example did not participate in changing the address, the final real address which would result is the same as the previous address given as follows: 0000111110000000. Hence it is seen that the same address is addressed in memory. Accordingly, when remote maintenance or diagnostic operations are required, only the shadow memory can be addressed and not the actual USART. This same principle is applied to other peripheral devices or registers attached to the I-bus also.

This shadow technique of addressing a piece of hardware such as the USART, the channel register or the channel control block register, etc. is particularly useful and saves cycle time when an interrupt occurs which requires a register such as the CCB register to have its contents replaced. In the conventional implementation, the contents of the register are read and stored in a temporary storage and the new information is written into the register. When it is required to replace the original contents of the register, the register is first read and the contents stored in a temporary storage, and then the original contents are written back in. With the shadow concept, since there is a shadow of the original information of the register stored in a predetermined location in main memory, all that is required in an interrupt mode is for the new information to be written into the register. The old information will still be retained in the shadow location and when it is necessary to replace it back into the register, it can be read directly from the shadow location. Since it takes approximately 3 microseconds for a read and 4 microseconds for a write, a total of 4 microseconds is saved during each complete cycle.

Figure 5A:
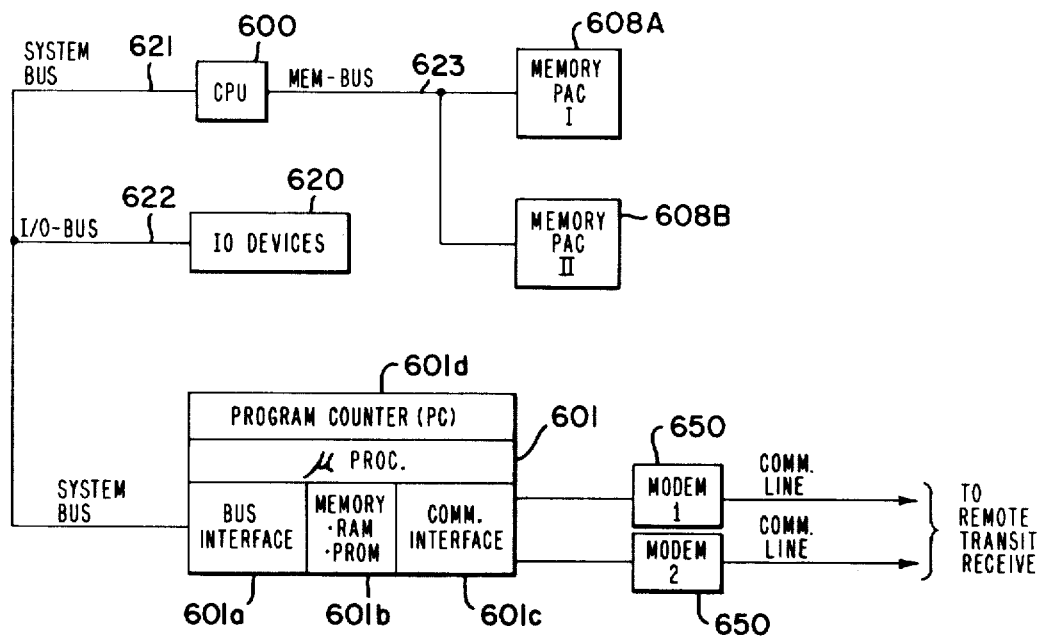
Figure 6B:
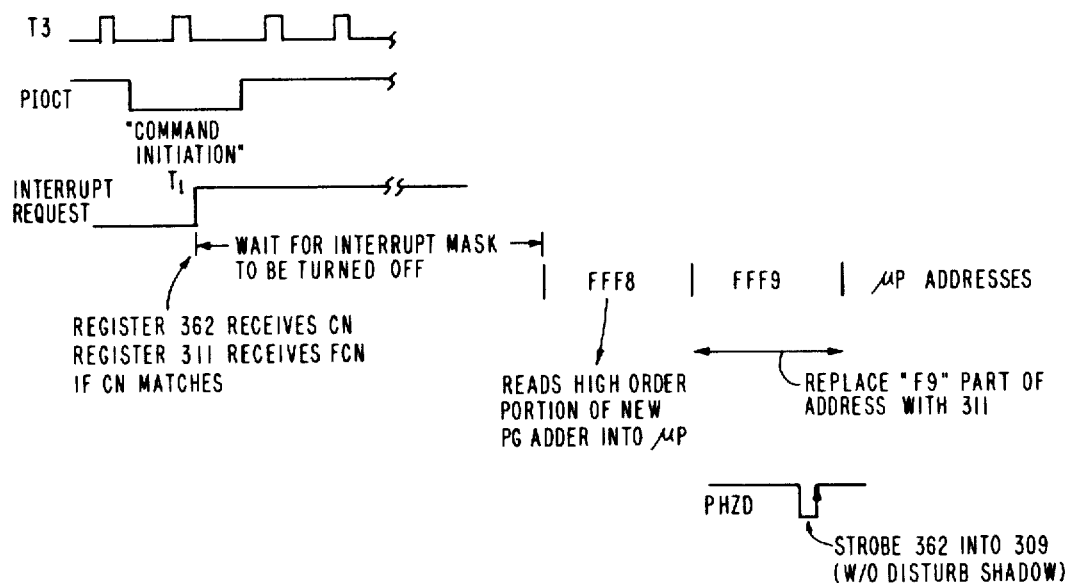
FIG. 6B is a timing diagram of the invention.
Figure 6A:
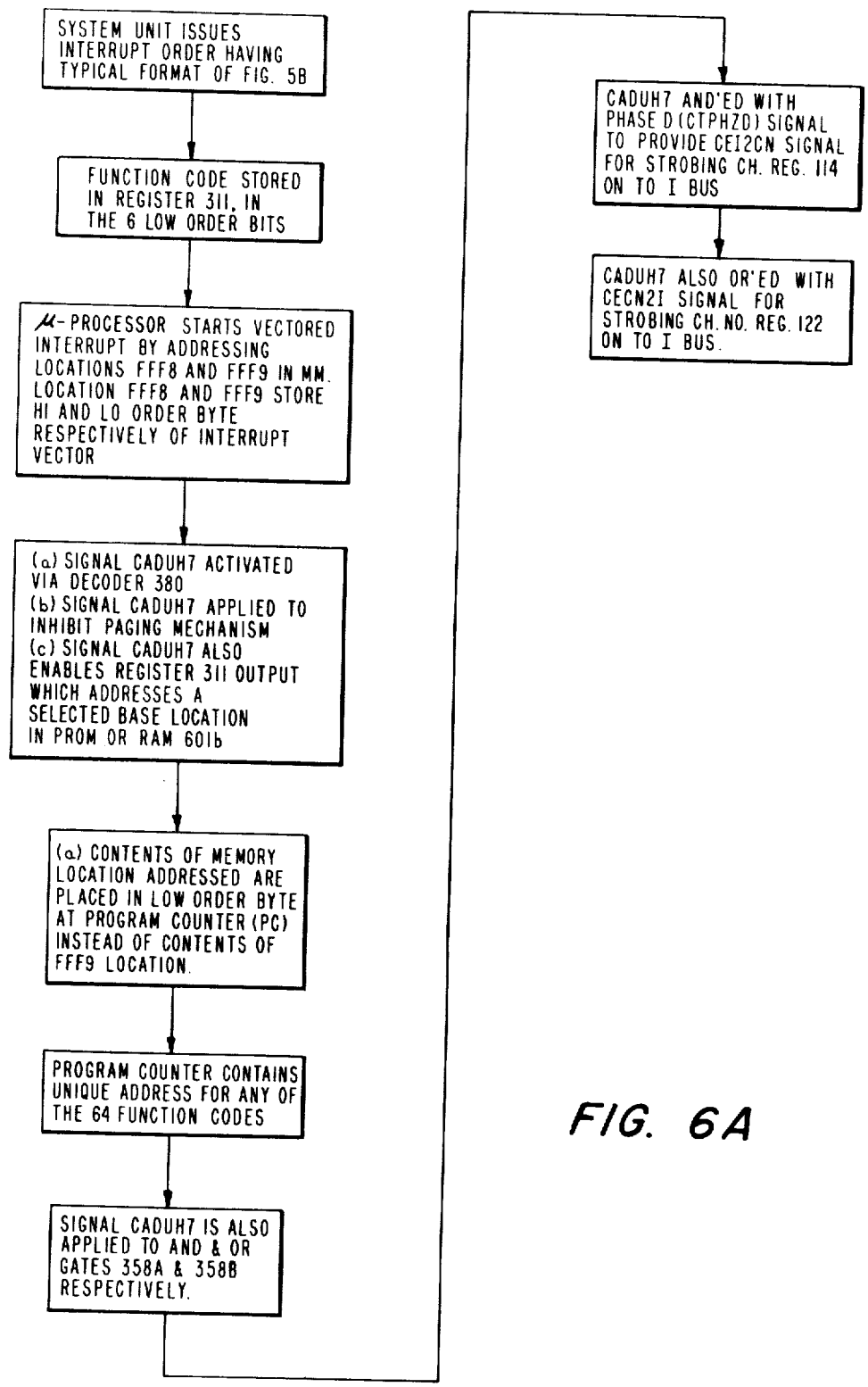
FIG. 6A is a flow chart description of portions of the invention.

Referring now to FIGS. 5A, B and C, and FIGS. 6A and B, the preferred embodiment of the vectored interrupt invention will be disclosed. FIG. 6B shows the timing diagrams of the interrupt sequence. The PTIME3 signal is a ground active TTL signal generated each 500 nanoseconds by the CPU 600 and has a nominal width of 100 nanoseconds. This signal is widely used by peripheral controllers of the system 600A to demark and set/reset conditions on buses 621, 622 and 623, and to act as a data strobe. BINTR signal is the interrupt request signal which is an open collector driven line on the buses and is switched to ground by any peripheral controller of the system which is attempting to interrupt. The PIOCT signal is also a ground active TTL signal utilized by the CPU 600 to indicate to a selected controller that there are encoded states on the bus which convey bus dialog control information to the controller. The DATA BUS VALID SIGNAL indicates that the data on the bus is valid. The PBYTE signal when activated by the CPU 600 provides a controller such as the microprocessor 601 with the low order byte (i.e., bits 8-15) of the word being addressed. Finally, the PBBUSY or PROCED signals when active indicate that either a controller is busy and rejects the command, or else it has accepted the last interrupt that was on the bus respectively.

The μP interrupt mechanism herein described is activated by the CPU's (600) initiation of an I/O instruction addressed by channel number to one of the I/O devices (620 or 601) via the I/O bus. Should the order be directed to this μP (601), a decoder within 601A recognizes the channel number and sets the μP interrupt request. The 16 bits of information on the system bus during command initiation (PIOCT, see FIG. 6B) comprise the 10 bit channel number and (a) (b) function code. At the time the CN is compared and if it is determined to be the CN of this μP, this information is stored in registers 362 (channel number) and 311 (FCN), and an interrupt request to the μP is stored in a flip-flop in 601A Since the μP treats this as a "masked interrupt," its action may be deferred. Timing of these actions is shown in FIG. 6B.

Figure 5B:
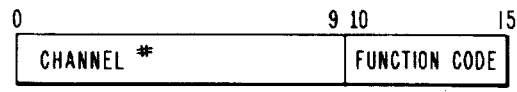

Typically when the microprocessor 601 receives an interrupt order, it sequentially addresses locations hexadecimal FFF8 and FFF9 in main memory 108 where the high order byte and low order byte respectively of the interrupt vector are stored. It will be seen that when the hexadecimal address FFF8 is placed in hexadecimal binary notation in the format denoted in FIG. 1A by numeral 103, it will have the following symbols: 1111111111111000. When hexadecimal notation FFF9 is placed in the above format, it will have the following symbols: 1111111111111101. Accordingly, when address FFF9 is addressed after the high order byte of the interrupt register is fetched the 1 bits of the FFF9 address become active. These bit signals are applied in various combinations or individually to various hardware circuit elements shown on FIG. 3; in other words, these address bits instead of addressing hexadecimal address FFF9 in main memory 608A and 608B are used to (a) disable the paging address mechanism described supra and (b) to enable decoder 380 in the CPU, which in turn (c) enables register 311 to provide a predetermined base address in PROM/RAM 601B (d) which in turn contains the address of a selected one of 64 function codes. This is accomplished when bits 0, 1, 2, 13, 14 and 15 of the above address are applied to input terminals of decoder 380 of FIG. 4C. As noted supra, when address hexadecimal FFF9 is being addressed, bits 13 and 14 will be zero and bit 15 will be one and these will be applied to the enable terminals of decoder 380. Moreover, bits 0, 1 and 2 of the address which will all be one's are applied to terminals 1, 2 and 4 of decoder 380 of FIG. 4C. Since the terminals on which bits 13 and 14 (i.e., signals CADUI4 and CADUI5) are applied have an inversion circuit decoder 380 which will be enabled, the information on terminals 1, 2 and 4 of decoder 380 will all be one's and will be decoded and provide an active signal CADUH7 on output terminal 7 of decoder 380. This is true because binary 111 decodes into decimal 7. The signal CADUH7 is then applied to the enable terminal F of register 311 on FIG. 3, and is further applied through an inverter 380A simultaneously to the enable/disable terminal of MUX's 301, 302, 303 and AND gate 311A, thus disabling the paging address mechanism described supra. Accordingly, instead of accessing location hexadecimal FFF9, register 311 is enabled and provides the low order bits 10, 11, 12, 13, 14 and 15 at its output terminals. These bits form an address for addressing the RAM or PROM 601B. The contents of the address of memory 601B are placed in the low order byte position of the program counter (PC) 601D. The information in register 311 is the function code information shown on FIG. 5B which has been delivered by the CPU when an interrupt has been initiated (see FIG. 6B PBYTE signal). Since the paging address mechanism has been inhibited, and since signal CADUH7 redirects the addressing location hexadecimal FFF9 to register 311, and since signal CADUH7 additionally enables register 311, the low order bits 10, 11, 12, 13, 14 and 15 of register 311 are used to access information in memory 601B which is placed in the low order byte position of program counter (PC) 601D. Since there are 6 bits in the low order byte of the function code, it can address up to 64 locations in memory such as the RAM or PROM 601B. Each of these locations contains the low order byte of the interrupt vector associated with its function code which when appended comprises the interrupt address.

Accordingly, depending on the information content of the function code, there is provided an interrupt which can start at any of 64 different locations in the PROM 601B and accordingly can provide up to 64 different interrupt operations. Moreover, as seen supra, the program computer counter 601D or other registers obtain their information from a shadow location and accordingly it is not necessary to first unload and then save the old information and then load the new information and repeat the same process over again when going out of the interrupt loop. It should also be noted that the normal interrupt procedure of the micrprocessor which directs the microprocessor to address FFF9 on interrupts is bypassed, and one address of 64 unique addresses is automatically provided by the function code, thus providing in effect a shortcut to 64 different vectors or routines.

Referring now to FIGS. 4 and 6B, it should be noted that when signal CADUH7 is activated, it is applied along with a phase D signal (CTPHZD to AND gate 358A enabling signal CEI2CN). Moreover, signal CADUH7 is OR'ed with signal CECN2I IH OR gate 358B to activate signal CECN2I. Signal CEI2CN is applied to the C terminal of channel register 309 on FIG. 3, which as has been previously discussed is equivalent to channel register 114A on FIG. 1A. Similarly, signal CECN2I is used for strobing the contents of channel number register 122 on FIG. 1A onto the I-bus or vice versa.

Accordingly, the vector interrupt does two things: (a) it automatically addresses any one of 64 locations in accordance to a unique function code; and (b) it loads the hardware channel number register to the channel number that we are being asked to service on the interrupt. The channel control block register (CCB) 115 may also be changed subsequently by firmware on an interrupt depending on what the function code is.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same results and fall within the spirit of the claimed invention. It is the intention, therefore, to limit the invention only as indicated by scope of the claims.

What is claimed is:

1. In a computer system having at least one communication channel for establishing communication with another computer system, one microprocessor, one universal asynchronous receiver transmitter (USART), one register and a memory, a U-bus for coupling said USART to said micrprocessor, an I-bus for coupling said register to said U-bus, and an M-bus for coupling said memory to said U-bus, a remote maintenance addressing apparatus for performing maintenance via said communication channel comprising:

(a) said microprocessor generating address signals representative of virtual addresses of a first predetermined number of address locations in said memory;
 (b) signal generating means coupled to said microprocessor and responsive to a first group of said address signals for generating a plurality of control signals;
 (c) first means for storing information signals for modifying said virtual addresses into real addresses for a second predetermined number of address locations in said memory;
 (d) second means coupled to said microprocessor and said first means and responsive to a first group of said plurality of control signals in a first state for selecting said address signals for addressing said first predetermined number of address locations; and responsive to said selected ones of said first group of said plurality of control signals in a second state for selecting said information signals for generating said address signals for addressing said second predetermined number of address locations greater than said first predetermined number of address locations; and,
 (e) third means coupled to said signal generating means and said first means and responsive to a first signal of a second group of said plurality of control signals in a second state and one of said information signals for generating a signal for enabling said USART for receiving data signals from a remote computer system for transfer to said memory for performing maintenance.

2. The addressing apparatus as recited in claim 1 including fourth means coupled to said signal generating means and responsive to a second or a third signal of said second group of said plurality of control signals in said second state for transferring said information signals between said U-bus and said register via said I-bus.

3. The addressing apparatus as recited in claim 2 including fifth means coupled to said U-bus, said M-bus and to said signal generating means and responsive to said first signal of said second group of said plurality of control signals in said second state for transferring said data signals to said memory from said remote computer system via said USART, said U-bus and said M-bus.

4. The addressing apparatus as recited in claim 3 wherein said register stores information utilized in modifying the virtual address.

5. The apparatus as recited in claim 1 wherein said signal generating means is a read only memory (ROM).

6. The apparatus as recited in claim 5 wherein said second means are multiplexers and drivers.

7. In a computer system having at least one communication channel for communicating with another computer system, one microprocessor, one universal asynchronous receiver transmitter (USART), one register and a memory, a U-bus for coupling said USART to said microprocessor, an I-bus for coupling said register to said U-bus, and an M-bus, for coupling said memory to said U-bus, a remote addressing apparatus for extending the microprocessor addressing capability comprising:
  (a) signal generating means for generating a predetermined number of control signals, said signal generating means having a plurality of terminals for abstracting the control signals from said signal generating means;
  (b) first means for addressing a first predetermined number of locations in the memory;
  (c) second means for addressing a second predetermined number of locations in the memory;
  (d) third means coupled to said signal generating means and said first means and responsive to a first signal of a second group of said plurality of control signals in a second state and one of said information signals for generating a signal for enabling said USART; and,
  (e) fourth means coupled to said signal generating means and said second means and responsive to said first signal of said second group of said plurality of control signals for coupling said U-bus to said M-bus and responsive to said address signals for addressing said second predetermined number of address locations, for simultaneously writing data signals to said USART and said memory in said computer system via said communication channel from said other computer system for performing maintenance.

8. The apparatus as recited in claim 7 including M-bus driver means and I-bus driver means responsive to a second signal or a third signal of said second group of said plurality of control signals in said second state for transferring said data signals between said register and said memory.

9. The apparatus as recited in claim 8 including said M-bus driver means and said I-bus driver means responsive to said second signal and said third signal of said second group of said plurality of control signals in said first state thereby disabling said I-bus driver means for transferring said data signals between said microprocessor and said memory.

10. The apparatus as recited in claim 9 including automatic dialing means for establishing communication between said computer system and said another computer system via said communication channel.

* * * * *